United States Patent
Funato et al.

(10) Patent No.: US 9,816,569 B2
(45) Date of Patent: Nov. 14, 2017

(54) ENGAGEMENT DEVICE AND POWER TRANSMISSION DEVICE

(71) Applicants: Yasumichi Funato, Toyota (JP); Hiroshi Hata, Nagoya (JP)

(72) Inventors: Yasumichi Funato, Toyota (JP); Hiroshi Hata, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 276 days.

(21) Appl. No.: 14/771,944

(22) PCT Filed: Mar. 22, 2013

(86) PCT No.: PCT/JP2013/058442
§ 371 (c)(1),
(2) Date: Sep. 1, 2015

(87) PCT Pub. No.: WO2014/147844
PCT Pub. Date: Sep. 25, 2014

(65) Prior Publication Data
US 2016/0010700 A1   Jan. 14, 2016

(51) Int. Cl.
*F16H 3/08*       (2006.01)
*F16D 27/09*    (2006.01)
(Continued)

(52) U.S. Cl.
CPC ............ *F16D 27/09* (2013.01); *B60K 6/387* (2013.01); *F16D 11/14* (2013.01); *F16D 27/14* (2013.01);
(Continued)

(58) Field of Classification Search
CPC ...... F16D 11/14; F16D 27/108; F16D 27/118; F16H 3/006
(Continued)

(56) References Cited

U.S. PATENT DOCUMENTS 2,969,134 A * 1/1961 Wiedmann ............ F16D 27/09
                                                        192/108
5,172,573 A * 12/1992 Sharp ...................... D06F 37/40
                                                        192/108
(Continued)

FOREIGN PATENT DOCUMENTS

JP       60-197433 A    10/1985
JP        7-190084 A     7/1995
(Continued)

OTHER PUBLICATIONS

International Search Report dated Apr. 16, 2013, in PCT/JP2013/058442 filed Mar. 22, 2013.

*Primary Examiner* — Ha D Ho
(74) *Attorney, Agent, or Firm* — Oblon, McClelland, Maier & Neustadt, L.L.P.

(57) ABSTRACT

An engagement device includes: an engaged body configured to rotate in conjunction with a rotary shaft; an engaging body arranged coaxially with the engaged body and configured to engage with the engaged body by movement in an axial direction; a power source configured to provide thrust to the engaging body in the axial direction; and a hub member configured to couple the engaging body to a torque receiver which receives torque transmitted from the engaged body at a time the engaging body engages with the engaged body. The engaged body, the engaging body, and the power source are accommodated in a closed space, and the hub member is at least a part of an outer shell forming the closed space.

10 Claims, 2 Drawing Sheets

(51) Int. Cl.
  *F16D 11/04* (2006.01)
  *F16D 11/14* (2006.01)
  *B60K 6/387* (2007.10)
  *F16D 27/14* (2006.01)
  *F16H 37/08* (2006.01)
  *F16D 11/00* (2006.01)

(52) U.S. Cl.
  CPC .... *F16H 37/0813* (2013.01); *F16D 2011/002* (2013.01); *F16D 2500/10462* (2013.01); *Y10S 903/914* (2013.01)

(58) Field of Classification Search
  USPC .............................. 74/325; 192/84.92, 108
  See application file for complete search history.

(56) References Cited

U.S. PATENT DOCUMENTS

| | | | |
|---|---|---|---|
| 6,843,353 B2* | 1/2005 | Majewski | F16D 27/118 |
| | | | 192/84.92 |
| 8,002,097 B2* | 8/2011 | Tsurumi | B63H 20/20 |
| | | | 192/108 |
| 8,834,217 B2 | 9/2014 | Yoshimura et al. | |

FOREIGN PATENT DOCUMENTS

| | | |
|---|---|---|
| JP | 2010-242895 A | 10/2010 |
| JP | 2015-14359 A | 1/2015 |
| JP | 2015-070646 A | 4/2015 |

* cited by examiner

ENGAGEMENT DEVICE AND POWER TRANSMISSION DEVICE

FIELD

The present invention relates to an engagement device and a power transmission device provided with the engagement device.

BACKGROUND

An engagement device which engages an engaging body with an engaged body arranged around a rotary shaft such as a dog clutch to mesh dog teeth with each other is known, for example (refer to Patent Literature 1, for example).

CITATION LIST

Patent Literature

Patent Literature 1: Japanese Patent Application Laid-open No. 2010-242895

SUMMARY

Technical Problem

In such an engagement device, there is a case in which a foreign object such as a fragment and abrasion powder is generated in a meshing portion by meshing operation. When the engagement device is applied to a power transmission device such as a vehicle, if the foreign object generated from the engagement device circulates within the power transmission device, this might affect operation of the power transmission device.

The present invention is achieved in view of the above-described circumstances and an object thereof is to provide the engagement device capable of preventing the foreign object generated along with engaging operation from being discharged to the outside and the power transmission device provided with the engagement device.

Solution to Problem

To solve the above-described problem, an engagement device according to the present invention includes: an engaged body configured to rotate in conjunction with a rotary shaft; an engaging body arranged coaxially with the engaged body and configured to engage with the engaged body by movement in an axial direction; a power source configured to provide thrust to the engaging body in the axial direction; and a hub member configured to couple the engaging body to a torque receiver which receives torque transmitted from the engaged body at a time the engaging body engages with the engaged body, wherein the engaged body, the engaging body, and the power source are accommodated in a closed space, and the hub member is at least a part of an outer shell forming the closed space.

Moreover, in the above-described engagement device, it is preferable that the outer shell forming the closed space is configured to cover at least a region on an outer side, in a radial direction, of an engaging portion between the engaging body and the engaged body.

Moreover, in the above-described engagement device, it is preferable that the engaging body is arranged around the rotary shaft, the power source is arranged on an outer side of the engaging body in the radial direction, the hub member includes an inner cylinder portion extending in an axial direction between the rotary shaft and the engaging body, the engaging body is located on a peripheral surface of the inner cylinder portion of the hub member in a manner in which movement in the axial direction is allowed and rotation is regulated, and the hub member has a shape extending radially outwardly from the inner cylinder portion while covering the engaging body and the power source.

Moreover, it is preferable that the above-described engagement device includes an accumulating unit configured to accumulate a foreign object generated in the closed space.

Similarly, to solve the above-described problem, a power transmission device according to the present invention includes the above-described engagement device on a power transmission path from a power source to a drive wheel.

Moreover, it is preferable that the above-described power transmission device includes: an engine; a first rotary machine; a power distributing mechanism connected to the engine and the first rotary machine and configured to distribute power of the engine to a drive wheel and the first rotary machine; and a second rotary machine connected to the drive wheel, and that the engaging body of the engagement device is coupled to a rotary shaft of the first rotary machine, and the engagement device is configured to regulate rotation of the first rotary machine by engaging the engaging body with the engaged body.

Moreover, in the above-described power transmission device, it is preferable that the engagement device is a dog clutch.

Advantageous Effects of Invention

An engagement device and a power transmission device according to the present invention may keep a foreign object in a closed space even when the foreign object is generated along with engaging operation of the engagement device, and as a result, there is an effect of preventing the foreign object generated along with the engaging operation from being discharged to the outside.

DESCRIPTION OF EMBODIMENTS

Figure 1:
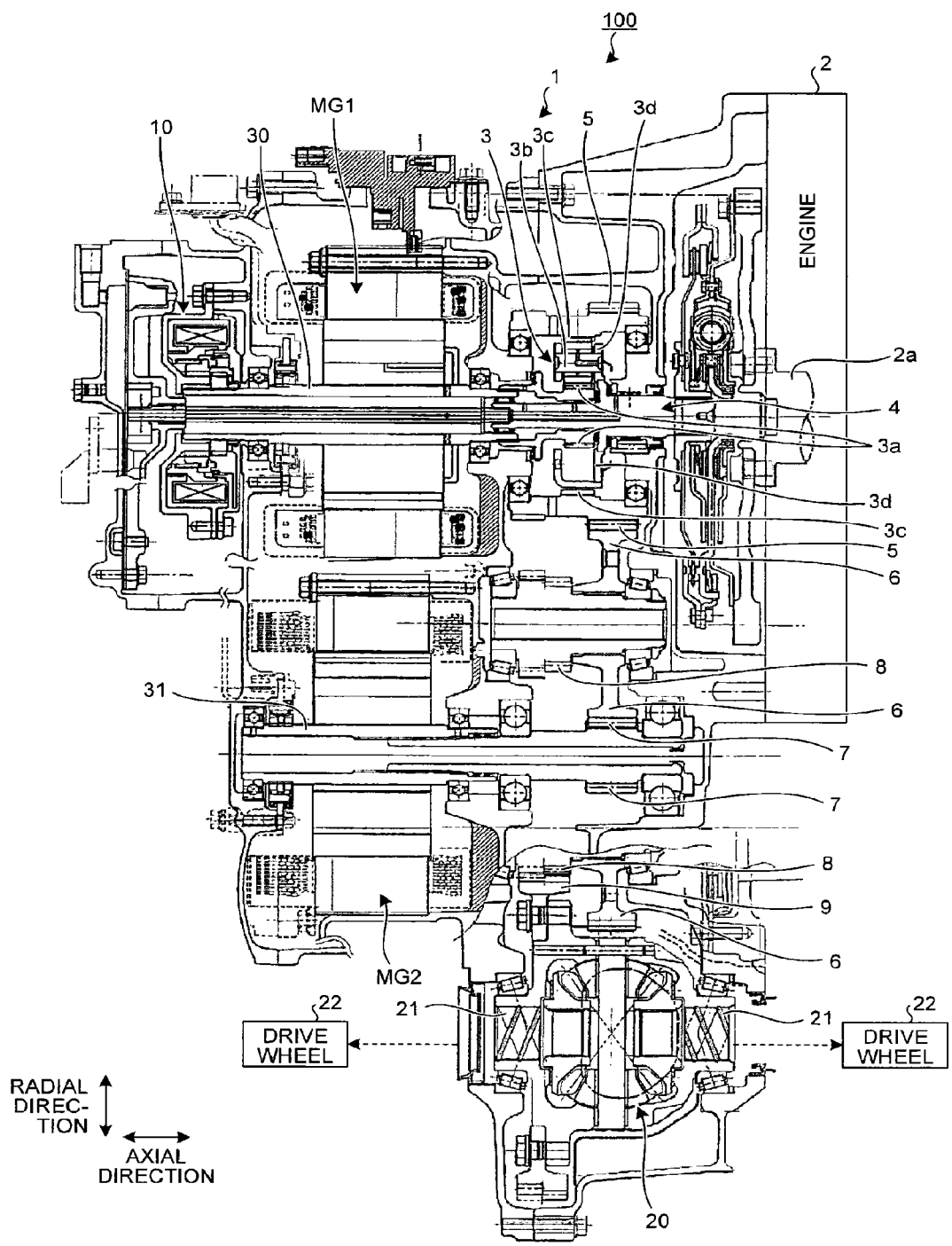
FIG. 1 is a vertical cross-sectional view of a power transmission device according to one embodiment of the present invention.

An embodiment of an engagement device and a power transmission device according to the present invention is hereinafter described with reference to the drawings. Meanwhile, in the following drawings, the same reference numeral is assigned to the same or corresponding parts and the description thereof is not repeated.

Figure 2:
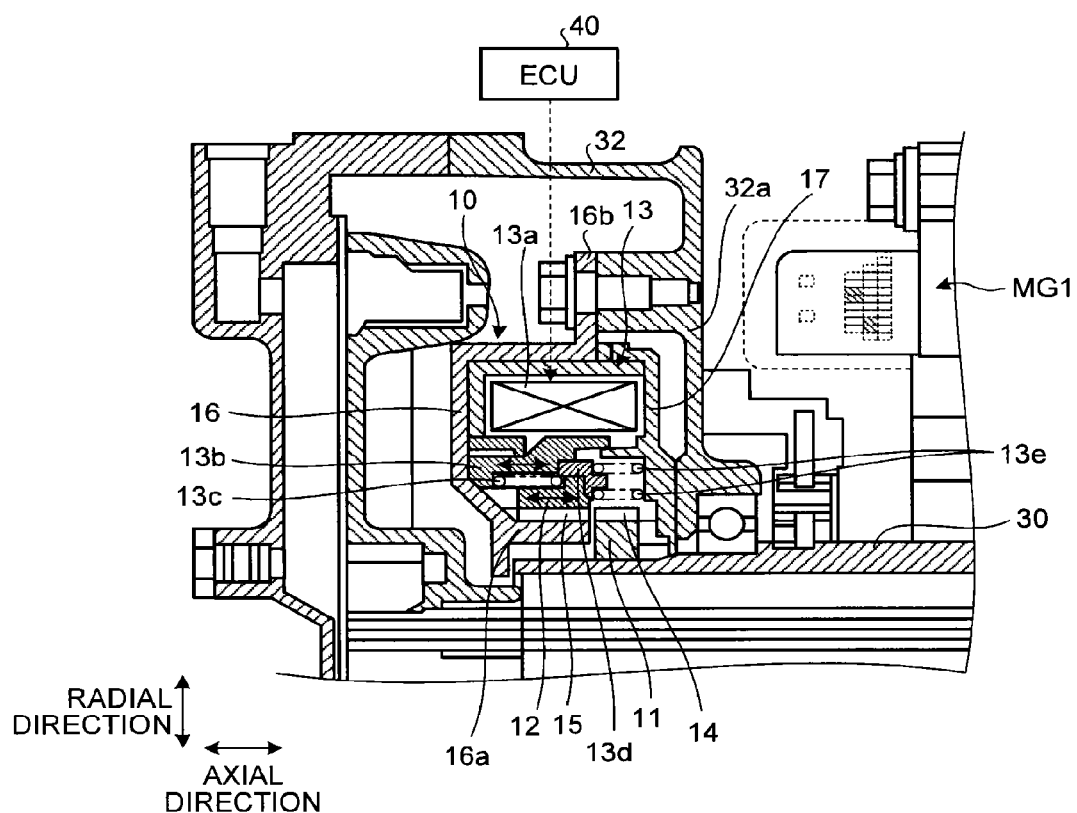
FIG. 2 is an enlarged view of a substantial part of an engagement device in FIG. 1.

A configuration of the engagement device and the power transmission device according to one embodiment of the present invention is first described with reference to FIGS. 1 and 2. FIG. 1 is a vertical cross-sectional view of the power transmission device according to one embodiment of the present invention and FIG. 2 is an enlarged view of a substantial part of the engagement device in FIG. 1. Meanwhile, in the following description, a horizontal direction of the drawing is represented as an "axial direction" and a vertical direction thereof is represented as a "radial direction".

As illustrated in FIG. 1, a power transmission device 1 according to this embodiment is mounted on a vehicle 100. The vehicle 100 is a hybrid vehicle including an engine 2, a first rotary machine MG1, and a second rotary machine MG2 as power sources.

The power transmission device 1 includes the engine 2, a planetary gear mechanism 3, the first rotary machine MG1, the second rotary machine MG2, and an engagement device 10. The power transmission device 1 is applicable to a front-engine front-wheel drive (FF) vehicle, a rear-engine rear-wheel drive (RR) vehicle or the like. The power transmission device 1 is mounted on the vehicle 100 such that the axial direction thereof coincides with a vehicle width direction, for example.

The engine 2 converts combustion energy of fuel to rotary movement of a rotary shaft 2a to output. The rotary shaft 2a of the engine 2 is connected to an input shaft 4. The rotary shaft 2a of the engine 2 is arranged coaxially with the input shaft 4. The input shaft 4 is connected to a carrier 3d of the planetary gear mechanism 3.

The planetary gear mechanism 3 has a function as a power distributing mechanism which distributes power from the engine 2 to an output side and the first rotary machine MG1. The planetary gear mechanism 3 includes a sun gear 3a, a pinion gear 3b, a ring gear 3c, and the carrier 3d. The sun gear 3a is arranged on an outer side of the input shaft 4 in the radial direction. The sun gear 3a is arranged coaxially with the input shaft 4 so as to be rotatable. The ring gear 3c is arranged coaxially with the sun gear 3a so as to be rotatable on an outer side of the sun gear 3a in the radial direction. The pinion gear 3b is arranged between the sun gear 3a and the ring gear 3c to mesh with the sun gear 3a and the ring gear 3c. The pinion gear 3b is rotatably supported by the carrier 3d arranged coaxially with the input shaft 4.

The carrier 3d is coupled to the input shaft 4 and integrally rotates with the input shaft 4. Therefore, the pinion gear 3b may rotate (revolve) around a central axis of the input shaft 4 and may rotate (rotate) around a central axis of the pinion gear 3b while being supported by the carrier 3d.

The first rotary machine MG1 is connected to the sun gear 3a. A rotary shaft 30 of the first rotary machine MG1 is arranged coaxially with the input shaft 4 and is connected to the sun gear 3a. Therefore, a rotor of the first rotary machine MG1 integrally rotates with the sun gear 3a. As illustrated in FIG. 2, the rotary shaft 30 of the first rotary machine MG1 is supported by a supporting member 32a extending from an inner surface of a housing 32 containing the engagement device 10 to the rotary shaft 30.

A counter drive gear 5 is connected to the ring gear 3c. The counter drive gear 5 is an output gear which integrally rotates with the ring gear 3c. The counter drive gear 5 and the ring gear 3c are provided on an outer peripheral surface and an inner peripheral surface of a cylinder member in a cylindrical shape, respectively. The counter drive gear 5 is arranged so as to be closer to the engine 2 than the ring gear 3c in the axial direction. The ring gear 3c is also an output element capable of outputting rotation input from the first rotary machine MG1 or the engine 2 to a side of a drive wheel 22.

The counter drive gear 5 meshes with a counter driven gear 6. A reduction gear 7 of the second rotary machine MG2 meshes with the counter driven gear 6. The reduction gear 7 is arranged on a rotary shaft 31 of the second rotary machine MG2 and integrally rotates with the rotary shaft 31. That is to say, torque output from the second rotary machine MG2 is transmitted to the counter driven gear 6 through the reduction gear 7. The reduction gear 7 having a smaller diameter than that of the counter driven gear 6 decelerates rotation of the second rotary machine MG2 to transmit to the counter driven gear 6.

The first and second rotary machines MG1 and MG2 are connected to a battery (not illustrated) through an inverter. The first and second rotary machines MG1 and MG2 may act as electric motors which convert electric power supplied from the battery to mechanical power to output and may act as power generators driven by input power to convert the mechanical power to the electric power. The electric power generated by the first and second rotary machines MG1 and MG2 may be stored in the battery. An AC synchronous motor generator may be used, for example, as each of the first and second rotary machines MG1 and MG2.

A drive pinion gear 8 is connected to the counter driven gear 6. The drive pinion gear 8 is arranged coaxially with the counter driven gear 6 and integrally rotates with the counter driven gear 6. The drive pinion gear 8 meshes with a differential ring gear 9 of a differential device 20. The differential device 20 is connected to the drive wheels 22 through right and left drive shafts 21. That is to say, the ring gear 3c is connected to the drive wheel 22 through the counter drive gear 5, the counter driven gear 6, the drive pinion gear 8, the differential device 20, and the drive shaft 21. The second rotary machine MG2 arranged so as to be closer to the drive wheel 22 than the ring gear 3c is connected to a power transmission path between the ring gear 3c and the drive wheel 22 and may transmit the power to the ring gear 3c and the drive wheel 22.

Engine torque output from the engine 2 is transmitted to a pair of drive wheels 22 through the planetary gear mechanism 3 as the power distributing mechanism and the differential device 20. The first rotary machine MG1 regeneratively generates the electric power by the engine torque distributed by the planetary gear mechanism 3 to be supplied when this acts as the power generator. When the first rotary machine MG1 acts as the power generator to perform regenerative control, the planetary gear mechanism 3 is used as a continuously variable transmission. That is to say, the output of the engine 2 is transmitted to the drive wheel 22 after a speed thereof is changed by the planetary gear mechanism 3. Meanwhile, it is possible to control an engine speed of the engine 2 and control the output to the drive wheel 22 by controlling drive of the second rotary machine MG2 or controlling a rotational speed of the first or second rotary machine MG1 or MG2.

In the vehicle 100 of this embodiment, the first rotary machine MG1 is arranged coaxially with the rotary shaft 2a of the engine 2 as illustrated in FIG. 1. The second rotary machine MG2 is arranged on the rotary shaft 31 different from the rotary shaft 2a of the engine 2. That is to say, the power transmission device 1 of this embodiment is of a pluriaxial type in which the input shaft 4 and the rotary shaft 31 of the second rotary machine MG2 are arranged on different axes.

In the power transmission device 1 of this embodiment, the planetary gear mechanism 3 is arranged coaxially with the rotary shaft 2a of the engine 2 between the engine 2 and the first rotary machine MG1. The engagement device 10 is arranged on a side opposite to the engine 2 across the first rotary machine MG1. That is to say, in the power transmission device 1 of this embodiment, the counter drive gear 5, the planetary gear mechanism 3, the first rotary machine MG1, and the engagement device 10 are arranged coaxially with the rotary shaft 2a of the engine 2 in this order from a side closer to the engine 2.

The engagement device 10 is coupled to the first rotary machine MG1 as illustrated in FIG. 1. The engagement device 10 is configured to be able to regulate rotation of the first rotary machine MG1 and is used as an MG1 locking mechanism which mechanically locks the rotation of the first rotary machine MG1.

When it is required to control the rotational speed of the first rotary machine MG1 to 0 when the engine speed is controlled or the output to the drive wheel is controlled by the power transmission device 1, the rotation of the first rotary machine MG1 is mechanically locked by the engagement device 10. Therefore, it becomes not necessary to electrically control the rotational speed of the first rotary machine MG1, so that power supply to the first rotary machine MG1 becomes not necessary and it is possible to improve fuel consumption. Since the engagement device 10 mechanically locks the rotation of the first rotary machine MG1, the planetary gear mechanism 3 no longer acts as the continuously variable transmission, thereby realizing a fixed stage.

The engagement device 10 is provided with a piece 11 (engaged body), a sleeve 12 (engaging body), and an actuator 13 (power source) as illustrated in FIG. 2.

The piece 11 is arranged around the rotary shaft 30 of the first rotary machine MG1 to be fixed on spline on a peripheral surface of the rotary shaft 30. The piece 11 integrally rotates in conjunction with the rotary shaft 30 of the first rotary machine MG1. Movement in the axial direction and the radial direction of the piece 11 is regulated.

The sleeve 12 is arranged around the rotary shaft 30 of the first rotary machine MG1 like the piece 11 and is arranged on an outer side of the piece 11 in the radial direction. The sleeve 12 is splined to a hub member 16 fixed to the supporting member 32a of the housing 32. That is to say, the sleeve 12 is configured to be movable in the axial direction and movement thereof in the radial direction and rotation thereof around the rotary shaft 30 are regulated.

The piece 11 and the sleeve 12 may engage/disengage an inner peripheral surface of the sleeve 12 with/from an outer peripheral surface of the piece 11 by the movement of the sleeve 12 in the axial direction. Dog teeth 14 are radially outwardly arranged on the outer peripheral surface of the piece 11 in a circumferential direction around the rotary shaft 30. Dog teeth 15 are radially inwardly arranged on the inner peripheral surface of the sleeve 12 in the circumferential direction around the rotary shaft 30. The dog teeth 14 and 15 form a meshing dog clutch and they may mesh with each other to engage the piece 11 with the sleeve 12. It is possible to fix the rotation of the first rotary machine MG1 by splining the sleeve 12 to the piece 11.

The actuator 13 is the power source which generates driving force in the axial direction to move the sleeve 12 in the axial direction. The actuator 13 specifically is a solenoid type electromagnetic actuator.

The actuator 13 is provided with an electromagnetic coil 13a, an armature 13b as a driving target fit on an inner peripheral side of the electromagnetic coil 13a, and a waiting mechanism spring 13c coupled between the armature 13b and the sleeve 12. The armature 13b is located so as to be movable in the axial direction and the waiting mechanism spring 13c is arranged so as to be extendable in the axial direction according to a relative positional relationship in the axial direction between the armature 13b and the sleeve 12. Along with the movement of the armature 13b toward the first rotary machine MG1 in the axial direction, the waiting mechanism spring 13c transmits pressing force received from the armature 13b to the sleeve 12, so that the sleeve 12 may also move in conjunction with the armature 13b in the same direction.

A plunger 13d is located so as to be movable in the axial direction in a position on a side of the first rotary machine MG1 (right side in FIG. 2) in the axial direction from the armature 13b and the sleeve 12. The plunger 13d is located such that this may abut the armature 13b and the sleeve 12 but is not coupled thereto. A return spring 13e is attached to an end on a side opposite to one end opposed to the armature 13b and the sleeve 12 (first rotary machine MG1 side) of the plunger 13d. The return spring 13e being a compression spring, for example, is held in an appropriately compressed state. The return spring 13e generates larger energizing force in a direction opposite to a moving direction of the plunger 13d as the plunger 13d moves toward the first rotary machine MG1, that is to say, as a meshing degree between the sleeve 12 and the piece 11 becomes larger.

An electronic control unit (ECU) 40 is mounted on the vehicle 100. The ECU 40 is a control device which controls each unit of the vehicle 100 based on information of various sensors in the vehicle 100. For example, the ECU 40 is connected to the engine 2, the first rotary machine MG1, and the second rotary machine MG2, and may control the engine 2, the first rotary machine MG1, and the second rotary machine MG2. In this embodiment, the ECU 40 is connected to the actuator 13 of the engagement device 10 and may control the engagement/disengagement of the engagement device 10 by controlling the movement of the sleeve 12 in the axial direction by controlling operation of the actuator 13.

The ECU 40 physically is an electronic circuit mainly formed of a well-known microcomputer including a central processing unit (CPU), a random access memory (RAM), a read only memory (ROM), and an interface. Functions of the ECU 40 are realized by loading an application program held in the ROM on the RAM to be executed by the CPU, thereby allowing various devices in the vehicle to operate under control of the CPU and reading/writing data from/in the RAM and ROM.

When the engagement device 10 is in the disengaged state, the actuator 13 stops and the sleeve 12 receives the energizing force of the return spring 13e in a direction toward the hub member 16 (leftward in FIG. 2) through the plunger 13d. By the energizing force, the sleeve 12 is held in a position on the hub member 16 side separated from the piece 11 (left side in FIG. 2) and is put into a state non-meshing with the piece 11. The piece 11 may rotate in conjunction with the rotary shaft 30 of the first rotary machine MG1.

When a current flows in the electromagnetic coil 13a in response to a control command from the ECU 40, a magnetic flux flows in a magnetic path around the electromagnetic coil 13a and force to move the armature 13b in a direction toward the piece 11 (rightward in FIGS. 1 and 2) is generated. The waiting mechanism spring 13c compresses along with the movement of the armature 13b, and the sleeve 12 receives thrust by the energizing force of the waiting mechanism spring 13c to move in the direction toward the piece 11. As a result, the dog teeth 15 of the sleeve 12 mesh with the dog teeth 14 of the piece 11 and the engagement device 10 is put into the engaged state. When the piece 11 rotates in conjunction with the rotary shaft 30 of the first rotary machine MG1, rotary torque of the piece 11 is transmitted to the supporting member 32a of the housing 32 via the dog teeth 14 and 15, the sleeve 12, and the hub member 16. That is to say, in this embodiment, the hub member 16 couples the piece 11 to the supporting member 32a of the housing 32 when the piece 11 engages with the sleeve 12 and the supporting member 32a of the housing 32 acts as a torque receiver which receives the torque transmitted from the piece 11 side.

Especially, in this embodiment, the piece 11, the sleeve 12, and the actuator 13 being components of the engagement device 10 are accommodated in a closed space. As illustrated in FIG. 2, each component of the engagement device 10 is arranged so as to be adjacent to the supporting member 32a in a position on a side opposite to the first rotary machine MG1 (left side in FIGS. 1 and 2) across the supporting member 32a of the housing 32. Furthermore, an entire engagement device 10 is covered with the hub member 16 from a side opposite to the first rotary machine MG1.

The hub member 16 has an inner cylinder portion 16a extending so as to be adjacent to the piece 11 to be splined to the sleeve 12 around the rotary shaft 30. The hub member 16 has a shape extending radially outwardly while covering the sleeve 12 and the actuator 13 from the inner cylinder portion 16a along a shape of the actuator 13 to be bolted to the supporting member 32a of the housing 32 on an outer edge 16b. The hub member 16 has an annular shape radially continuously extending from the inner cylinder portion 16a to the outer edge 16b as seen in the axial direction. When the hub member 16 is attached to the supporting member 32a of the housing 32, the piece 11, the sleeve 12, and the actuator 13 being the components of the engagement device 10 are fully covered with the hub member 16 as seen from the side of the hub member 16 (left side in FIG. 2). That is to say, the engagement device 10 is located in the closed space formed of an outer shell including the supporting member 32a of the housing 32 and the hub member 16.

As described above, a meshing structure of the engagement device 10 of this embodiment is of the dog clutch type in which the dog teeth 14 of the piece 11 mesh with the dog teeth 15 of the sleeve 12. Therefore, in the engagement device 10 of this embodiment, there is a case in which a foreign object such as a fragment and abrasion powder is generated by meshing operation of the dog teeth. When the foreign object generated from the engagement device 10 in this manner circulates within the power transmission device 1, this might affect reliability of the operation of the power transmission device 1 and durability and reliability of each component. For example, the foreign object might break insulating paper of the first and second rotary machines MG1 and MG2 to cause malfunction such as insulation failure. When the foreign object enters a bearing which supports the rotary shaft 30 and the like, abnormal sound and break might occur. It is possible that the foreign object gets stuck in oil seal to cause oil leakage, and eventually cause burning.

In contrast, in the engagement device 10 of this embodiment, the piece 11, the sleeve 12, and the actuator 13 are accommodated in the closed space as described above. The hub member 16 forms at least a part of the outer shell forming the closed space accommodating the engagement device 10. By this configuration, even when the foreign object is generated along with the engaging operation of the engagement device 10, it becomes possible to keep the foreign object in the closed space, thereby preventing the foreign object generated from the engagement device 10 from being discharged to the outside.

As described above, the hub member 16 is configured to couple the sleeve 12 to the housing 32 and transmit the rotary torque of the piece 11 to the housing 32 at the time of the engagement and is adjacently arranged around the engagement device 10. It is possible to make the closed space relatively small by making the hub member 16 a part of the outer shell of the closed space, so that a compact space may be realized. It is possible to inhibit addition of new parts for forming the closed space by using the hub member 16 for forming the closed space and a reduced cost may be realized.

Herein, since the piece 11 integrally rotates with the rotary shaft 30 of the first rotary machine MG1, it is considered that a situation in which the piece 11 rotates when the foreign object is generated at the time of the engagement and the foreign object is discharged radially outwardly by centrifugal force frequently arises. In the engagement device 10 of this embodiment, the outer shell forming the closed space covers at least a region on an outer side, in the radial direction, of an engaging portion between the piece 11 and the sleeve 12 (meshing portion between the dog teeth 14 and 15). It is possible to surely receive the foreign object discharged radially outwardly by the outer shell by this configuration, so that it is possible to more surely prevent the foreign object generated from the engagement device 10 from being discharged to the outside.

In the engagement device 10 of this embodiment, the sleeve 12 is arranged around the rotary shaft 30 of the first rotary machine MG1 and the actuator 13 is arranged on the outer side of the sleeve 12 in the radial direction. The hub member 16 includes the inner cylinder portion 16a extending in the axial direction between the rotary shaft 30 and the sleeve 12. The sleeve 12 is located on the peripheral surface of the inner cylinder portion 16a of the hub member 16 in a manner in which the movement thereof in the axial direction is allowed and the rotation thereof is regulated. The hub member 16 has a shape extending from the inner cylinder portion 16a radially outwardly while covering the sleeve 12 and the actuator 13.

Since the hub member 16 has a shape conforming to an outer shape of the engagement device 10 by this configuration, it is possible to minimize the closed space formed of the hub member 16 to accommodate the engagement device 10, thereby realizing a more compact space.

It is possible to prevent the foreign object generated from the engagement device 10 from circulating within the power transmission device 1 (transaxle) by applying such engagement device 10 on the power transmission path from the power source of the power transmission device 1 to the drive wheel, thereby improving the reliability of the operation of the power transmission device 1 and the durability and reliability of each component.

The engagement device 10 of this embodiment may have a configuration provided with a foreign object accumulating structure (accumulating unit) to accumulate the foreign object generated in the closed space. The foreign object accumulating structure may have a configuration capable of accumulating the foreign object generated in the closed space in an arbitrary position which has no effect on the operation of the engagement device 10 and may have a configuration of allowing magnet located in an arbitrary position in the closed space to absorb the generated foreign object, for example.

It is possible to prevent the foreign object generated from the engagement device 10 from circulating within the closed space by providing such foreign object accumulating structure. According to this, it is possible to prevent the foreign object from being interposed between the components of the engagement device 10 or getting stuck in the engagement device 10, thereby improving the durability of the engagement device 10.

The components of the engagement device 10 are made an assembly. As illustrated in FIG. 2, the piece 11, the sleeve 12, and the actuator 13 of the engagement device 10 are assembled to the hub member 16 by an assembling member 17 in a state in which they are combined with one another. That is to say, the engagement device 10 is formed as an integral unit in which the components are combined. By this configuration, assembling operation and changing operation of the engagement device 10 in the power transmission device 1 may be performed easily and installation easiness may be improved.

As illustrated in FIG. 1, in the power transmission device 1 of this embodiment, the counter drive gear 5, the planetary gear mechanism 3, the first rotary machine MG1, and the engagement device 10 are arranged coaxially with the rotary shaft 2*a* of the engine 2 in this order from the side closer to the engine 2. By this configuration, when the engagement device 10 is embedded in the power transmission device 1, it is sufficient to make a space for the engagement device 10 on an end of the power transmission device 1 on a side opposite to the engine and it is not required to change arrangement of the counter drive gear 5, the planetary gear mechanism 3, and the first rotary machine MG1. Therefore, it becomes possible to share a part of the components of the power transmission device 1 regardless of whether the engagement device 10 is applied to the power transmission device 1. Procedure before attaching the engagement device 10 of the assembling operation of the power transmission device 1 may be made the same, so that it is possible to share a line of the assembling operation regardless of whether the engagement device 10 is applied to the power transmission device 1.

Although the embodiment of the present invention is described above, the above-described embodiment is presented as an example and it is not intended to limit the scope of the invention. The above-described embodiment may be carried out in various other modes, and it is possible to variously omit, replace, and change without departing from the spirit of the invention. The above-described embodiment and modification thereof are included in the invention recited in claims and equivalents thereof as well as in the scope and spirit of the invention.

Although a configuration of applying the engagement device 10 according to the present invention as the MG1 locking mechanism which mechanically locks the rotation of the first rotary machine MG1 is illustrated in the above-described embodiment, the engagement device 10 according to the present invention may also be applied as an engaging element related to another element in the power transmission device 1 such as over drive locking, engine direct shaft gear shift, and engine shaft disconnection, for example.

In the above-described embodiment, a configuration of coupling the sleeve 12 to a fixed end (housing 32) to regulate the rotation of the piece 11 when the piece 11 engages with the sleeve 12, the configuration of a so-called brake device is illustrated as the engagement device 10 according to the present invention, the engagement device 10 may have a configuration of coupling the sleeve 12 to another rotary element and transmitting the rotary torque of the piece 11 to the rotary element to integrally rotate when the piece 11 engages with the sleeve 12, the configuration of a so-called clutch device.

Although the dog clutch type to allow the dog teeth 14 and 15 to mesh with each other is illustrated as the engagement device 10 according to the present invention in the above-described embodiment, it is also possible to replace the same with another engaging element such as a wet multi plate clutch, for example.

REFERENCE SIGNS LIST

1 Power Transmission Device
2 Engine
3 Planetary Gear Mechanism (Power Distributing Mechanism)
10 Engagement Device
11 Piece (Engaged Body)
12 Sleeve (Engaging Body)
13 Actuator (Power Source)
16 Hub Member
16*a* Inner Cylinder Portion
22 Drive Wheel
30 Rotary Shaft
32 Housing
32*a* Supporting Member (Torque Receiver)
100 Vehicle
MG1 First Rotary Machine
MG2 Second Rotary Machine

The invention claimed is:

1. An engagement device comprising:
an engaged body configured to rotate in conjunction with a rotary shaft;
an engaging body arranged coaxially with the engaged body and configured to engage with the engaged body by movement in an axial direction;
a power source configured to provide thrust to the engaging body in the axial direction; and
a hub member configured to couple the engaging body to a torque receiver which receives torque transmitted from the engaged body at a time the engaging body engages with the engaged body, wherein
the engaged body, the engaging body, and the power source are accommodated in a closed space, and
the hub member is at least a part of an outer shell forming the closed space.

2. The engagement device according to claim 1, wherein the outer shell forming the closed space is configured to cover at least a region on an outer side, in a radial direction, of an engaging portion between the engaging body and the engaged body.

3. The engagement device according to claim 1, wherein
the engaging body is arranged around the rotary shaft,
the power source is arranged on an outer side of the engaging body in the radial direction,
the hub member includes an inner cylinder portion extending in an axial direction between the rotary shaft and the engaging body,
the engaging body is located on a peripheral surface of the inner cylinder portion of the hub member in a manner in which movement in the axial direction is allowed and rotation is regulated, and
the hub member has a shape extending radially outwardly from the inner cylinder portion while covering the engaging body and the power source.

4. The engagement device according to claim 1, comprising an accumulating unit configured to accumulate a foreign object generated in the closed space.

5. A power transmission device comprising:
an engagement device on a power transmission path from a power source to a drive wheel, the engagement device including an engaged body configured to rotate in conjunction with a rotary shaft;

an engaging body arranged coaxially with the engaged body and configured to engage with the engaged body by movement in an axial direction;

a power source configured to provide thrust to the engaging body in the axial direction; and a hub member configured to couple the engaging body to a torque receiver which receives torque transmitted from the engaged body at a time the engaging body engages with the engaged body, wherein the engaged body, the engaging body, and the power source are accommodated in a closed space, and the hub member is at least a part of an outer shell forming the closed space.

6. The power transmission device according to claim 5, comprising:

an engine;

a first rotary machine;

a power distributing mechanism connected to the engine and the first rotary machine and configured to distribute power of the engine to a drive wheel and the first rotary machine; and a second rotary machine connected to the drive wheel, wherein the engaging body of the engagement device is coupled to a rotary shaft of the first rotary machine, and the engagement device is configured to regulate rotation of the first rotary machine by engaging the engaging body with the engaged body.

7. The power transmission device according to claim 5, wherein the engagement device is a dog clutch.

8. The power transmission device according to claim 5, wherein the outer shell forming the closed space is configured to cover at least a region on an outer side, in a radial direction, of an engaging portion between the engaging body and the engaged body.

9. The power transmission device according to claim 5, wherein the engaging body is arranged around the rotary shaft, the power source is arranged on an outer side of the engaging body in the radial direction, the hub member includes an inner cylinder portion extending in an axial direction between the rotary shaft and the engaging body, the engaging body is located on a peripheral surface of the inner cylinder portion of the hub member in a manner in which movement in the axial direction is allowed and rotation is regulated, and the hub member has a shape extending radially outwardly from the inner cylinder portion while covering the engaging body and the power source.

10. The power transmission device according to claim 5, comprising an accumulating unit configured to accumulate a foreign object generated in the closed space.

* * * * *